(12) United States Patent
Kang et al.

(10) Patent No.: US 7,963,268 B2
(45) Date of Patent: Jun. 21, 2011

(54) CONTROL STRATEGY FOR TRANSITIONS BETWEEN HOMOGENEOUS-CHARGE COMPRESSION-IGNITION AND SPARK-IGNITION COMBUSTION MODES

(75) Inventors: Jun-Mo Kang, Ann Arbor, MI (US); Chen-Fang Chang, Troy, MI (US); Vijay Ramappan, Novi, MI (US); Allen B. Rayl, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 12/400,022

(22) Filed: Mar. 9, 2009

(65) Prior Publication Data

US 2009/0229564 A1    Sep. 17, 2009

Related U.S. Application Data

(60) Provisional application No. 61/035,597, filed on Mar. 11, 2008.

(51) Int. Cl.
*F02M 57/06* (2006.01)

(52) U.S. Cl. .................................. 123/294; 123/297

(58) Field of Classification Search .................. 123/443, 123/305, 294, 90.15, 321, 345–348, 297
See application file for complete search history.

(56) References Cited

U.S. PATENT DOCUMENTS

| | | | |
|---|---|---|---|
| 6,971,365 B1 | 12/2005 | Najt | |
| 6,994,072 B2 | 2/2006 | Kuo | |
| 7,021,277 B2 * | 4/2006 | Kuo et al. | 123/299 |
| 7,059,281 B2 | 6/2006 | Kuo | |
| 7,128,047 B2 * | 10/2006 | Kuo et al. | 123/299 |
| 7,228,839 B2 * | 6/2007 | Kuo et al. | 123/294 |
| 7,328,683 B2 | 2/2008 | Weiss et al. | |
| 7,346,446 B2 | 3/2008 | Kang | |
| 7,756,627 B2 * | 7/2010 | Casal Kulzer | 701/104 |
| 2006/0196469 A1 | 9/2006 | Kuo | |
| 2007/0261672 A1 | 11/2007 | Lippert | |
| 2008/0066713 A1 * | 3/2008 | Megli et al. | 123/295 |
| 2009/0018749 A1 * | 1/2009 | Sauer et al. | 701/103 |
| 2009/0229565 A1 * | 9/2009 | Kang et al. | 123/295 |
| 2009/0301434 A1 * | 12/2009 | Hiller et al. | 123/347 |

FOREIGN PATENT DOCUMENTS

| | | |
|---|---|---|
| JP | 2004-176610 | 6/2004 |
| JP | 2005-325818 | 11/2005 |
| JP | 2007-138928 | 6/2007 |

* cited by examiner

*Primary Examiner* — John T Kwon

(57) ABSTRACT

A method for transitioning a spark-ignition direct injection internal combustion engine between a controlled auto-ignition combustion mode and a homogeneous spark-ignition combustion mode includes operating the engine in a stratified-charge spark-ignition combustion mode during the transitioning.

18 Claims, 3 Drawing Sheets

CONTROL STRATEGY FOR TRANSITIONS BETWEEN HOMOGENEOUS-CHARGE COMPRESSION-IGNITION AND SPARK-IGNITION COMBUSTION MODES

CROSS REFERENCE TO RELATED APPLICATIONS

This application claims the benefit of U.S. Provisional Application No. 61/035,597, filed on Mar. 11, 2008 which is hereby incorporated herein by reference.

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion comprises a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

Controlled auto-ignition (HCCI) combustion depends strongly on factors such as cylinder charge composition, temperature, and pressure at intake valve closing. Hence, the control inputs to the engine must be carefully coordinated to ensure auto-ignition combustion. Controlled auto-ignition (HCCI) combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before top-dead-center (TDC) and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC intake. Both a cylinder charge composition and temperature are strongly affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

In engine operation, the engine airflow is controlled by selectively adjusting position of the throttle valve and adjusting opening and closing of intake valves and exhaust valves. On engine systems so equipped, opening and closing of the intake valves and exhaust valves are accomplished using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a controlled auto-ignition (HCCI) combustion mode, the engine control comprises lean or stoichiometric air/fuel ratio operation with the throttle wide open to minimize engine pumping losses. When the engine operates in the SI combustion mode, the engine control comprises stoichiometric air/fuel ratio operation, with the throttle valve controlled over a range of positions from 0% to 100% of the wide-open position to control intake airflow to achieve the stoichiometric air/fuel ratio.

In an engine configured for SI and controlled auto-ignition (HCCI) combustion modes, transitioning between combustion modes can be complex. The engine control module must coordinate actuations of multiple devices in order to provide a desired air/fuel ratio for the different modes. During a transition between a controlled auto-ignition (HCCI) combustion mode and SI combustion mode, valve lift switching occurs nearly instantaneously, while cam phasers and pressures in the manifold have slower dynamics. Until the desired air/fuel ratio is achieved, incomplete combustion and misfires can occur, leading to torque disturbances.

SUMMARY

A spark-ignition, direct injection internal combustion engine includes a controllable valvetrain having intake and exhaust valves, and a controllable intake air throttle valve. A method for controlling the engine includes commanding engine operation to transition between a controlled auto-ignition combustion mode and a homogeneous spark-ignition combustion mode, and operating the engine in a stratified-charge spark-ignition combustion mode during a transition.

BRIEF DESCRIPTION OF THE DRAWINGS

One or more embodiments will now be described, by way of example, with reference to the accompanying drawings, in which.

DETAILED DESCRIPTION

Figure 1:
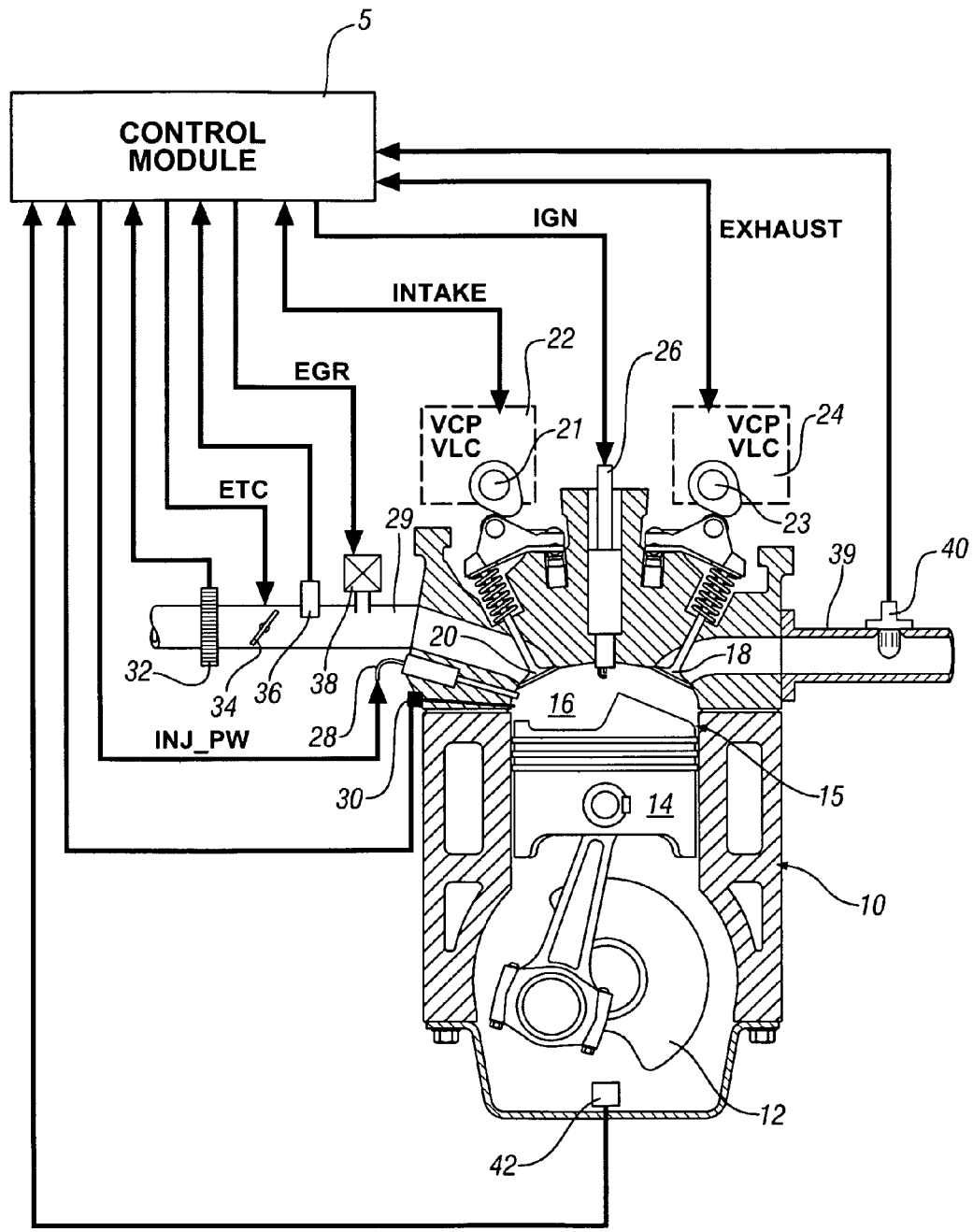
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and an intermediate stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device (not shown) to transmit tractive power to a driveline of a vehicle (not shown). The transmission can include a hybrid transmission including torque machines operative to transfer tractive power to a driveline.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the airflow. The air intake devices preferably include a mass airflow sensor 32 for monitoring mass airflow and intake air temperature. A throttle valve 34 preferably comprises an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably comprises a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors (not shown) to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown).

The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via a throttle pedal and a brake pedal, not shown) to determine an operator torque request the control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. The intake and exhaust valves 20 and 18 are in the low-lift valve position and the intake and exhaust lift timing operate with NVO. One or more fuel injection events can be executed during an engine cycle including at least one injection during a compression phase.

During engine operation in the homogeneous spark-ignition (SI-H) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

The intermediate stratified-charge spark-ignition combustion mode includes operating substantially lean of stoichiometry. Fuel injection timing is preferably close in time to the spark ignition timing to prevent the air/fuel mixture from homogenizing into a uniformly disbursed mixture. The injected fuel mass is injected in the combustion chamber 15 with rich layers around the spark plug and leaner air/fuel ratio areas further out at the time of spark ignition. A fuel pulse width can end as the spark event begins or immediately prior thereto.

Figure 2:
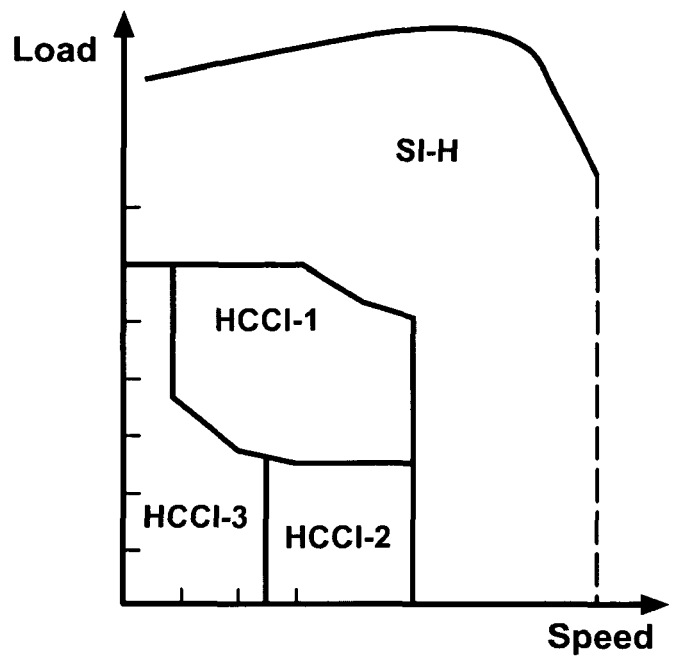
FIG. 2 graphically illustrates exemplary speed and load operating zones for the respective combustion modes, in accordance with the present disclosure.

FIG. 2 schematically depicts preferred combustion modes including the homogeneous spark-ignition (SI-H) and controlled auto-ignition (HCCI) combustion modes associated with identified engine operating zones. The engine operating zones are defined by and corresponding to states of engine parameters, in this embodiment comprising engine speed and load. The engine load can be derived from engine parameters including the fuel flow and the intake manifold pressure. The combustion modes preferably include the homogeneous spark-ignition (SI-H) combustion mode, a first controlled auto-ignition (HCCI) combustion mode (HCCI-1), a second controlled auto-ignition (HCCI) combustion mode (HCCI-2), and a third controlled auto-ignition (HCCI) combustion mode (HCCI-3). Preferably, each combustion mode is associated with a fuel injection strategy, e.g., the first controlled auto-ignition (HCCI) combustion mode may be associated with a single injection fuel injection strategy. The preferred combustion mode associated with the engine operating zone may be predetermined based upon a specific hardware application and engine operating parameters, including combustion stability, fuel consumption, emissions, engine torque output, and others. Boundaries for the engine operating zones that define the preferred combustion mode can be precalibrated and stored in the control module 5 in one embodiment.

The control module 5 transitions engine operation to the preferred combustion mode associated with the engine 10 to increase fuel efficiencies and engine stability, and/or decrease emissions. A change in one of the engine parameters, e.g., speed and load, can effect a change in the engine operating zone. The control module 5 commands a change in the preferred combustion mode associated with a change in the engine operating zone.

During combustion mode transitions, the engine 10 is controlled to operate at a preferred air/fuel ratio and the intake airflow is controlled to achieve the preferred air/fuel ratio. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the homogeneous spark-ignition (SI-H) and controlled auto-ignition (HCCI) combustion modes. Airflow is controlled by adjusting the throttle valve 34 and the intake and exhaust VCP/VLC devices 22 and 24 to control the opening timing and profiles of the intake and exhaust valve(s) 20 and 18. Operation in the two combustion modes requires different settings for the intake and exhaust VCP/VLC devices 22 and 24 in terms of valve timing and profiles of the intake and exhaust valve(s) 20 and 18 and the throttle valve 34 for throttle position.

Figure 3:
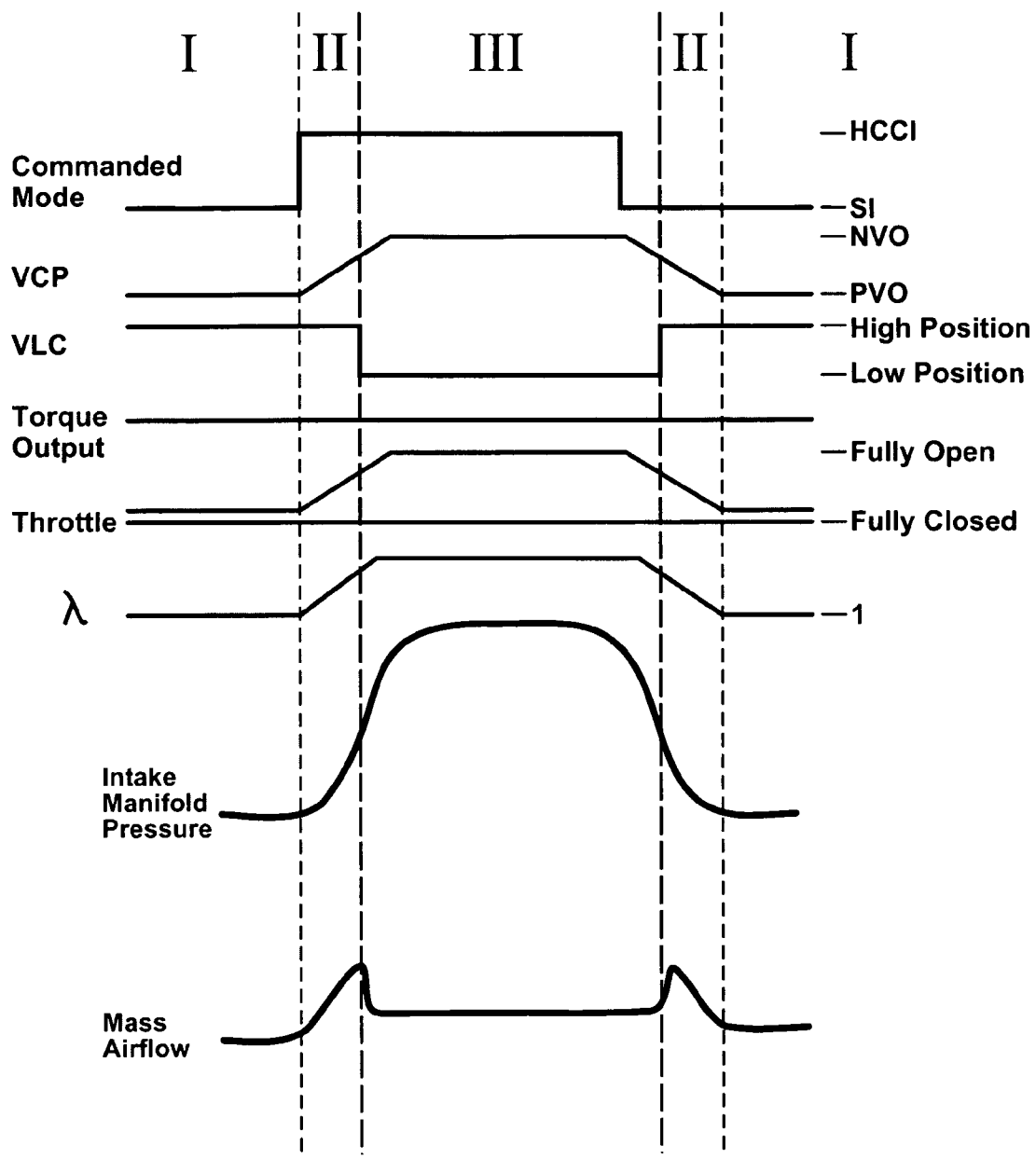
FIG. 3 graphically illustrates actuator commands and corresponding states of engine parameters during combustion mode transitions, in accordance with the present disclosure.

FIG. 3 graphically illustrates actuator commands and corresponding states of engine parameters during combustion mode transitions between the homogeneous spark-ignition (SI-H) combustion mode (I) and the controlled auto-ignition (HCCI) combustion mode (III), including corresponding states of engine parameters. Each transition from the homogeneous spark-ignition (SI-H) combustion mode to the controlled auto-ignition (HCCI) combustion mode includes an intermediate operation in the stratified-charge spark-ignition combustion mode (II). Each transition from the controlled auto-ignition (HCCI) combustion mode to the homogeneous spark-ignition (SI-H) combustion mode includes an intermediate operation in the stratified-charge spark-ignition combustion mode.

During a transition from the controlled auto-ignition (HCCI) combustion mode to the homogeneous spark-ignition (SI-H) combustion mode, the engine 10 transitions to operate at a stoichiometric air/fuel ratio and the airflow is controlled to achieve the stoichiometric air/fuel ratio. The control module 5 controls the throttle 34 to a predetermined position and commands the intake and exhaust VCP/VLC systems 22 and 24 to adjust the intake and exhaust cam phasers to a positive valve overlap (PVO), thereby decreasing manifold pressure. The intake and exhaust VCP/VLC systems 22 and 24 switch the intake and exhaust valves 20 and 18 from the low-lift valve position to a high-lift valve position, thereby increasing airflow. Injected fuel mass corresponds to engine load.

During a transition from the homogeneous spark-ignition (SI-H) combustion mode to the controlled auto-ignition (HCCI) combustion mode, the engine 10 transitions to operate at a lean or stoichiometric air/fuel ratio and the airflow is controlled to achieve the desired air/fuel ratio. The control module 5 commands the throttle 34 to open to a predetermined position and the intake and exhaust VCP/VLC systems 22 and 24 to adjust the intake and exhaust cam phasers to a negative valve overlap (NVO), thereby increasing manifold pressure. Airflow subsequently increases due to the increasing manifold pressure until the VLC portion of the intake and exhaust VCP/VLC systems 22 and 24 switches the intake and exhaust valves 20 and 18 from the high-lift valve position to the low-lift valve position. Fuel mass corresponds to engine load.

During the combustion mode transition between the homogeneous spark-ignition (SI-H) combustion mode and the controlled auto-ignition (HCCI) combustion mode there is a time lag between the desired cylinder air charge and the actual cylinder air charge within the cylinder 16. This is due to dynamic response time of the intake and exhaust cam phasers of the intake and exhaust VCP/VLC systems 22 and 24, the throttle 34, and manifold pressure. Thus, for brief periods during the combustion mode transitions, the actual air/fuel ratio may be leaner than desired depending on operating conditions and the dynamic response of the engine. The lag between the desired cylinder air charge and the actual cylinder air charge occurs when the combustion mode switches from one of the controlled auto-ignition (HCCI) combustion modes to the homogeneous spark-ignition (SI-H) combustion mode. Combustion stability improves in the homogeneous spark-ignition (SI-H) mode as the throttle 34 and the intake and exhaust cam phasers of the intake and exhaust VCP/VLC systems 22 and 24 are adjusted to decrease airflow. Likewise, a transition from the homogeneous spark-ignition (SI-H) combustion mode to one of the controlled auto-ignition (HCCI) combustion modes create increased airflow into the cylinder 16 and thus a time lag between steady state recognition of the desired change in cylinder air charge and the actual cylinder air charge.

During each combustion mode transition, the engine 10 operates in the stratified-charge spark-ignition combustion mode. As shown, the engine 10 transitions at a fixed fueling rate. The control module 5 adjusts the throttle 34 and signals the intake and exhaust VCP/VLC systems 22 and 24 to adjust cam phasing. These actuator changes affect the intake manifold pressure and cylinder volume occupied by the cylinder air charge to achieve a desired cylinder air charge. The desired cylinder air charge is determined based on the fuel mass injected and a desired air/fuel ratio, which is at one of a stoichiometric air/fuel ratio and a lean air/fuel ratio depending on the selected combustion mode. During the transition period between combustion modes when airflow increases (as manifested in the high air/fuel ratio excursion subsequent to the transition initiation), the control module 5 will operate the engine 10 at the stratified-charge spark-ignition combustion mode, preferably subsequent to achieving a predetermined cylinder air charge, i.e., subsequent to exceeding a predetermined cylinder air charge threshold. The control module 5 preferably discontinues the intermediate stratified-charge spark-ignition combustion mode preferably after achieving a second predetermined cylinder air charge, i.e., subsequent to receding from the predetermined cylinder air charge threshold.

When transitioning from the homogeneous spark-ignition (SI-H) combustion mode to the controlled auto-ignition (HCCI) combustion mode, initiating the stratified-charge spark-ignition combustion mode preferably begins immediately subsequent to a combustion mode transition command. The stratified-charge spark-ignition combustion mode is preferably discontinued when the intake and exhaust VCP/VLC systems 22 and 24 switching the intake and exhaust valves 20 and 18 from the high-lift valve position to the low-lift valve position. Alternatively, the control module may discontinue the stratified-charge spark-ignition combustion mode when the desired cylinder air charge for the controlled auto-ignition (HCCI) combustion mode is achieved, or when the intake airflow is within a predetermined airflow range. When transitioning from the controlled auto-ignition (HCCI) combustion mode to the homogeneous spark-ignition (SI-H) combustion mode, initiating the intermediate stratified-charge spark-ignition combustion mode preferably begins immediately subsequent to the intake and exhaust VCP/VLC systems 22 and 24 switching the intake and exhaust valves 20 and 18 from the low-lift valve position to the high-lift valve position. The intermediate stratified-charge spark-ignition combustion mode preferably is discontinued when the desired cylinder air charge for the homogeneous spark-ignition (SI-H) combustion mode is achieved or when the intake airflow is within a predetermined airflow range.

FIG. 3 depicts airflow increases during the combustion mode transitions resulting in a leaner air/fuel ratio. The intermediate stratified-charge spark-ignition combustion mode may operate the engine 10 in the lean air/fuel ratio conditions during the lag between desired cylinder air charge and the actual cylinder air charge. When airflow increases during the mode transitions, a fuel pulse is desirably injected during the compression stroke immediately prior to the spark ignition to effect stratified-charge spark-ignition combustion mode. Preferably, the fuel pulse ends just prior to or just as a spark discharge from the spark plug 26 occurs. The intermediate stratified-charge spark-ignition combustion mode may continue during combustion mode transitions until a mass airflow trajectory reaches the desired state for the desired combustion mode (i.e., lean of stoichiometry for homogeneous spark-ignition (SI-H) to controlled auto-ignition (HCCI) combustion mode transitions and stoichiometry for controlled auto-ignition (HCCI) combustion mode to homogeneous spark-ignition (SI-H) combustion mode transitions). As shown in FIG. 3, the intermediate stratified-charge spark-ignition combustion mode is effected in the transition from controlled auto-ignition (HCCI) combustion mode to the homogeneous spark-ignition (SI-H) combustion mode and from the homogeneous spark-ignition (SI-H) to controlled auto-ignition (HCCI) combustion mode.

Figure 4:
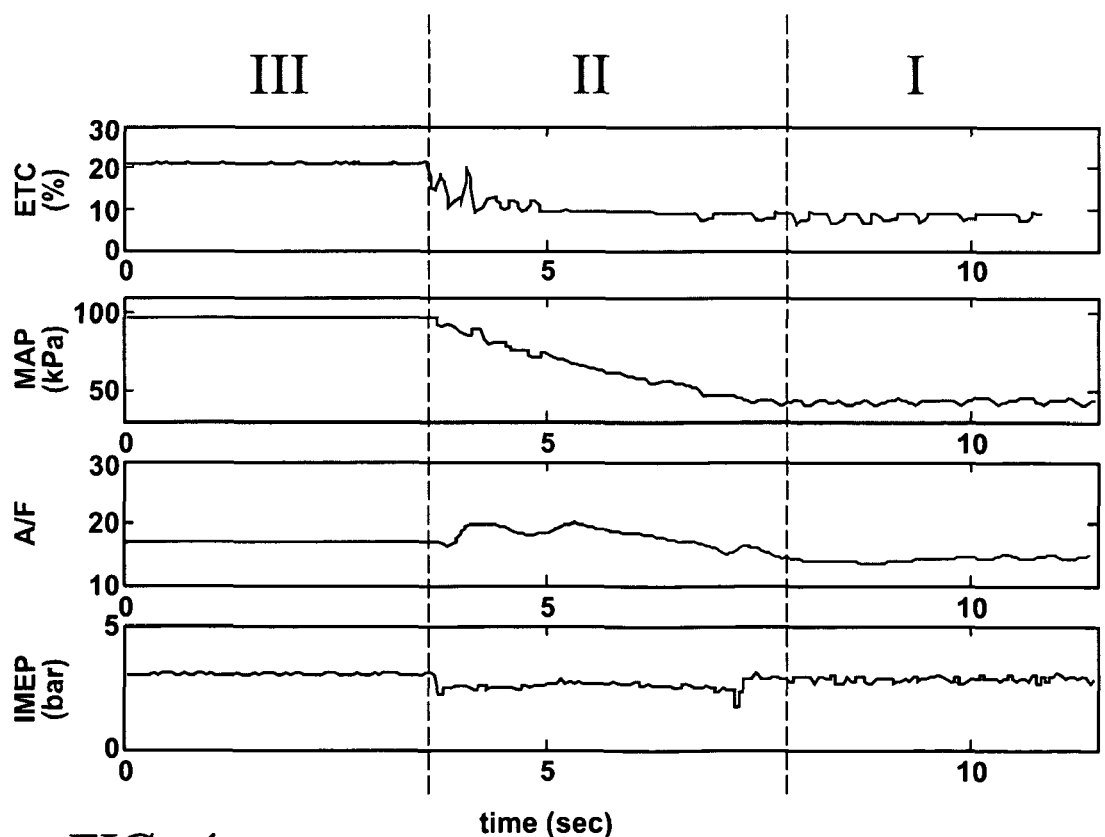
FIG. 4 graphically illustrates states of engine parameters, in accordance with the present disclosure.

FIG. 4 graphically shows operation of an exemplary engine transitioning from the controlled auto-ignition (HCCI) combustion mode (III) to the homogeneous spark-ignition (SI-H) combustion mode (I) including the intermediate stratified-charge spark-ignition combustion mode (II). The stratified-charge spark-ignition combustion mode operates over the time lag between the desired cylinder air charge and the actual cylinder air charge (estimated by the control module 5) during the combustion mode transition. As FIG. 4 depicts, implementation of the intermediate stratified-charge spark-ignition combustion mode increases engine stability and improves torque output consistency.

Alternative embodiments may comprise other internal combustion engines having controllable multi-step valve opening control, including those employing multi-step valve openings and/or variable cam phasing for only the intake valves or the exhaust valves.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a spark-ignition direct injection internal combustion engine including a controllable valvetrain having intake and exhaust valves, and a controllable intake air throttle valve, the method comprising:
commanding engine operation to transition between a controlled auto-ignition combustion mode and a homogeneous spark-ignition combustion mode; and
operating the engine in a stratified-charge spark-ignition combustion mode during said transition, wherein operating in the stratified-charge spark-ignition combustion mode comprises:
controlling the valve cam phasing and variable lift control devices;
injecting a fuel pulse during a compression stroke sufficient to power the engine; and
executing a spark discharge immediately subsequent to the injected fuel pulse.

2. The method of claim 1, further comprising:
monitoring an engine operating point; and
commanding engine operation to transition to a preferred one of the controlled auto-ignition combustion mode and the homogeneous spark-ignition combustion mode based on the engine operating point.

3. The method of claim 2, further comprising commanding the engine operation to transition to the preferred one of the controlled auto-ignition combustion mode and the homogeneous spark-ignition combustion mode when the engine operating point corresponds to an engine operating zone associated therewith.

4. The method of claim 2, further comprising:
associating the controlled auto-ignition combustion mode with a first engine operating zone;
associating the homogeneous spark-ignition combustion mode with a second engine operating zone;
operating the engine in the controlled auto-ignition when the engine operating point corresponds to the first engine operating zone; and
commanding engine operation to transition to the homogeneous spark-ignition combustion mode when the engine operating point transitions from the first to the second engine operating zone.

5. The method of claim 4, further comprising:
operating the engine in the homogeneous spark ignition combustion mode when the engine operating point corresponds to the second engine operating zone; and
commanding engine operation to transition to the controlled auto-ignition combustion mode when the engine operating point transitions from the second engine operating zone to the first engine operating zone.

6. The method of claim 1, wherein the stratified-charge spark-ignition combustion mode further comprises:
estimating a cylinder air charge determined from operation in the selected combustion mode; and
controlling the intake air throttle valve based upon the estimated cylinder air charge.

7. The method of claim 1, wherein a transition to the controlled auto-ignition combustion mode from the homogeneous spark-ignition combustion mode comprises:
opening the throttle valve;
controlling the intake and exhaust valves to a negative valve overlap; and
controlling the intake valves from a high lift to a low lift.

8. The method of claim 7, wherein the controllable valvetrain further includes a variable cam phasing mechanism, and wherein controlling the intake and exhaust valves to a negative valve overlap comprises controlling the variable cam phasing mechanism.

9. The method of claim 7, wherein the controllable valvetrain further includes a two-step variable lift control mechanism, and wherein controlling the intake valves from a high lift to a low lift comprises controlling the two-step variable lift control mechanism.

10. The method of claim 7, further comprising:
operating the engine in the stratified-charge spark-ignition combustion mode immediately subsequent to commanding engine operation to transition to the controlled auto-ignition combustion mode.

11. The method of claim 1, wherein a transition to the homogeneous spark-ignition combustion mode from the controlled auto-ignition combustion mode comprises:
controlling the throttle valve to achieve a predetermined position;
controlling the intake and exhaust valves to a positive valve overlap; and
controlling the intake valves from a low lift to a high lift.

12. The method of claim 11, wherein the controllable valvetrain further includes a variable cam phasing mechanism, and wherein controlling the intake and exhaust valves to a positive valve overlap comprises controlling the variable cam phasing mechanism.

13. The method of claim 11, wherein the controllable valvetrain further includes a two-step variable lift control mechanism, and wherein controlling the intake valves from a low lift to a high lift comprises controlling the two-step variable lift control mechanism.

14. The method of claim 11, further comprising:
operating the engine in the stratified-charge spark-ignition combustion mode subsequent to controlling the intake valves from a low lift to a high lift.

15. The method of claim 1, further comprising:
monitoring intake airflow; and
operating the engine in the stratified-charge spark-ignition combustion mode during a transition when the intake airflow exceeds a predetermined threshold and discontinuing operating the engine in the stratified-charge spark-ignition combustion mode when the intake airflow recedes from the predetermined threshold.

16. Method for controlling a spark-ignition direct injection internal combustion engine configured to operate in one of a controlled auto-ignition combustion mode and a homogeneous spark-ignition combustion mode, comprising:
operating in an initial combustion mode comprising one of the controlled auto-ignition combustion mode and the homogeneous spark-ignition combustion mode;
monitoring an engine operating point;
determining a preferred combustion mode corresponding to the engine operating point;
commanding engine operation to transition from the initial combustion mode to the preferred combustion mode when the preferred combustion mode is not the initial combustion mode; and
operating the engine in a stratified-charge spark-ignition combustion mode during the transition to the preferred combustion mode, wherein operating in the stratified-charge spark-ignition combustion mode comprises:
estimating a cylinder air charge determined from operation in the preferred combustion mode;
controlling a throttle valve, valve cam phasing device, and variable lift control device based upon the estimated cylinder air charge;
injecting a fuel pulse during a compression stroke sufficient to power the engine; and
executing a spark discharge at or immediately subsequent to the injected fuel pulse.

17. The method of claim 16, further comprising:
adjusting an intake airflow during the transition from the initial combustion mode to the preferred combustion mode; and
invoking operating in the stratified-charge spark-ignition combustion mode from the initial combustion mode when the intake airflow is within a predetermined airflow range.

18. The method of claim 17, further comprising:
invoking operating in the preferred combustion mode from the stratified-charge spark-ignition combustion mode when the intake airflow is outside the predetermined airflow range.

* * * * *